US012657486B2

(12) United States Patent
Higuchi et al.

(10) Patent No.: US 12,657,486 B2
(45) Date of Patent: Jun. 16, 2026

(54) COMPUTER-READABLE RECORDING MEDIUM STORING EVALUATION PROGRAM, EVALUATION METHOD, AND INFORMATION PROCESSING DEVICE

(71) Applicant: FUJITSU LIMITED, Kawasaki (JP)

(72) Inventors: Yuji Higuchi, Kawasaki (JP); Ikuya Morikawa, Kawasaki (JP); Toshiya Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1088 days.

(21) Appl. No.: 17/727,927

(22) Filed: Apr. 25, 2022

(65) Prior Publication Data

US 2023/0009999 A1 Jan. 12, 2023

(30) Foreign Application Priority Data

Jul. 6, 2021 (JP) ................................. 2021-111967

(51) Int. Cl.
*G06N 5/04* (2023.01)
*G06F 18/214* (2023.01)
(Continued)

(52) U.S. Cl.
CPC .............. *G06N 5/04* (2013.01); *G06F 18/214* (2023.01); *G06F 21/554* (2013.01); *G06N 20/20* (2019.01); *H04L 63/1466* (2013.01)

(58) Field of Classification Search
None
See application file for complete search history.

(56) References Cited

U.S. PATENT DOCUMENTS

2011/0235900 A1 9/2011 Porikli et al.
2017/0243028 A1* 8/2017 LaFever .............. G06F 21/6254
(Continued)

FOREIGN PATENT DOCUMENTS

EP 3929818 A1 12/2021
JP 2011-210252 A 10/2011
(Continued)

OTHER PUBLICATIONS

Liu et al. "SocInf: Membership Inference Attacks on Social Media Health Data With Machine Learning" (Oct. 2019) (Year: 2019).*
(Continued)

*Primary Examiner* — Paul R Fisher
(74) *Attorney, Agent, or Firm* — Fujitsu Intellectual Property Center

(57) ABSTRACT

A recording medium storing a program causing a computer to execute: acquiring, for each model, an attack result of an estimation attack, the acquiring for a respective model being performed by using the respective model and a plurality of data, each model being a model trained by using synthetic data that simulates training data, an amount of the synthetic data for each model being different from each other; specifying, based on the attack result for each model, specific data from among the plurality of data; performing the estimation attack by using the specific data for a specific model of which an amount of the synthetic data is between the amounts of the synthetic data used for any two models; and evaluating, based on an attack result for the specific data and the attack result for each model, a resistance to the estimation attack for the specific model.

9 Claims, 15 Drawing Sheets

(51) Int. Cl.
    *G06F 21/55*     (2013.01)
    *G06N 20/20*     (2019.01)
    *H04L 9/40*     (2022.01)

(56)               References Cited

U.S. PATENT DOCUMENTS

| | | | |
|---|---|---|---|
| 2019/0188564 | A1 | 6/2019 | Lockett |
| 2019/0220605 | A1 | 7/2019 | Kounavis et al. |
| 2020/0034566 | A1* | 1/2020 | Zhang ..................... G06Q 50/01 |
| 2021/0064760 | A1* | 3/2021 | Sharma ................. G06F 21/577 |
| 2021/0174153 | A1* | 6/2021 | Rane ...................... G06F 18/217 |
| 2021/0304070 | A1* | 9/2021 | Takashige ................ G06N 5/04 |
| 2022/0138348 | A1* | 5/2022 | Bernau .................... G06N 3/09 |
| | | | 726/26 |
| 2022/0156368 | A1* | 5/2022 | Spyridopoulos ......... G06N 3/09 |
| 2023/0359931 | A1* | 11/2023 | Teranishi ................. G06N 3/08 |
| 2024/0249205 | A1* | 7/2024 | Hatakeyama ........... G06N 5/01 |

FOREIGN PATENT DOCUMENTS

| | | | | |
|---|---|---|---|---|
| JP | 2020-160743 | A | 10/2020 | |
| WO | WO-2020028440 | A1 * | 2/2020 | .............. G06N 3/08 |
| WO | 2020/230699 | A1 | 11/2020 | |

OTHER PUBLICATIONS

Chang, Hongyan et al., "On the Privacy Risks of Algorithmic Fairness", arxiv.org, Cornell University Library, 201 Olin Library Cornell University Ithaca, NY 14853, XP081926767, 12 pages, Apr. 7, 2021.
Extended European Search Report dated Oct. 11, 2022 for corresponding European Patent Application No. 22169181.9, 7 pages.

\* cited by examiner

FIG. 5

TRAINING DATA GROUP

| TRAINING DATA | LABEL |
|---|---|
| ACTUAL TRAINING DATA A | LABEL A |
| ACTUAL TRAINING DATA B | LABEL B |
| ... | ... |

TEST DATA GROUP

| TEST DATA | LABEL |
|---|---|
| ACTUAL TEST DATA A | LABEL A |
| ACTUAL TEST DATA B | LABEL B |
| ... | ... |

FIG. 6

| ATTACK TARGET DATA |
| :---: |
| DATA 1 |
| DATA 2 |
| ... |

FIG. 7

| MODEL | TYPE |
|---|---|
| MACHINE LEARNING MODEL M1 | NUMBER OF PIECES OF SYNTHETIC DATA =0% |
| MACHINE LEARNING MODEL MN | NUMBER OF PIECES OF SYNTHETIC DATA =10% |
| ... | ... |
| ATTACK MODEL | - |

FIG. 11

DISPLAY :
SYNTHETIC DATA
RATE 1 IS
OPTIMUM

COMPUTER-READABLE RECORDING MEDIUM STORING EVALUATION PROGRAM, EVALUATION METHOD, AND INFORMATION PROCESSING DEVICE

CROSS-REFERENCE TO RELATED APPLICATION

This application is based upon and claims the benefit of priority of the prior Japanese Patent Application No. 2021-111967, filed on Jul. 6, 2021, the entire contents of which are incorporated herein by reference.

FIELD

The embodiments discussed herein are related to an evaluation program, an evaluation method, and an information processing device.

BACKGROUND

Systems using machine learning have been rapidly developed and used. An operation of machine learning is divided into two phases including a training phase and an inference phase. The training phase is a phase for generating machine learning using training data, and the inference phase is a phase for acquiring an inference result from input data using the trained machine learning model.

On the other hand, security problems unique to machine learning have been found. For example, a membership inference attack for estimating whether or not a certain piece of data is used for a machine learning model or the like has been known. By using the membership inference attack, for example, training data used for a machine learning model related to diseases is detected, which causes privacy invasion or the like.

In recent years, as countermeasures against the membership inference attack, grid research for estimating a change in a resistance to the membership inference attack according to an amount of synthetic data has been known. For example, the grid research is a technique that prepares training data in with various amounts of synthetic data to be added, generates a plurality of machine learning models using the training data, actually attacks each machine learning model, and comprehensively measures an attack resistance.

Japanese Laid-open Patent Publication No. 2011-210252, U.S. Patent Application Publication No. 2019/0188564, International Publication Pamphlet No. WO 2020/230699, Japanese Laid-open Patent Publication No. 2020-160743, and U.S. Patent Application Publication No. 2019/0220605 are disclosed as related art.

SUMMARY

According to an aspect of the embodiments, there is A non-transitory computer-readable recording medium storing an evaluation program for causing a computer to execute processing. In an example, the processing includes: acquiring, for each of a plurality of machine learning models, an attack result of a membership inference attack performed on the each of plurality of machine learning models, the acquiring of the attack result for a respective machine learning model being performed by using the respective machine learning model and a plurality of pieces of data to be attacked by the membership inference attack, each of the plurality of machine learning models being a machine learning model trained by using synthetic data that simulates training data, an amount of the synthetic data used for each of the plurality of machine learning models being different from each other; specifying, based on the acquired attack result for each of the plurality of machine learning models, specific data from among the plurality of pieces of data; performing the membership inference attack by using the specific data for a specific machine learning model of which an amount of the synthetic data is between the amounts of the synthetic data used for training of the respective machine learning models; and evaluating, based on an attack result for the specific data and the attack result acquired for each of the plurality of machine learning models, a resistance to the membership inference attack for the specific machine learning model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of information stored in a dataset DB;

FIG. 6 is a diagram illustrating an example of information stored in an attack target data DB;

FIG. 7 is a diagram illustrating an example of information stored in a model DB;

FIG. 11 is a diagram for explaining membership inference attack resistance evaluation;

DESCRIPTION OF EMBODIMENTS

However, with the technique described above, it is needed to repeat training and attacks, measurement takes long time, and it is difficult to efficiently evaluate a resistance to a membership inference attack.

For example, in grid search, a machine learning model is generated using training data of which an amount of synthetic data is changed, a resistance is evaluated by attacking the machine learning model, another machine learning model is further generated using training data of which an amount of synthetic data is changed, and a resistance is evaluated by attacking the another machine learning model. In this way, with the grid search, the generation of the machine learning model and the resistance evaluation are repeated, and it takes time to evaluate the resistance.

In one aspect, an object is to provide an evaluation program, an evaluation method, and an information processing device that can efficiently evaluate a resistance to a membership inference attack.

Hereinafter, embodiments of an evaluation program, an evaluation method, and an information processing device disclosed in the present application will be described in detail with reference to the drawings. Note that the embodiments do not limit the present embodiment. Furthermore, each of the embodiments may be appropriately combined within a range without inconsistency.

First Embodiment

Description of Information Processing Device

Figure 1:
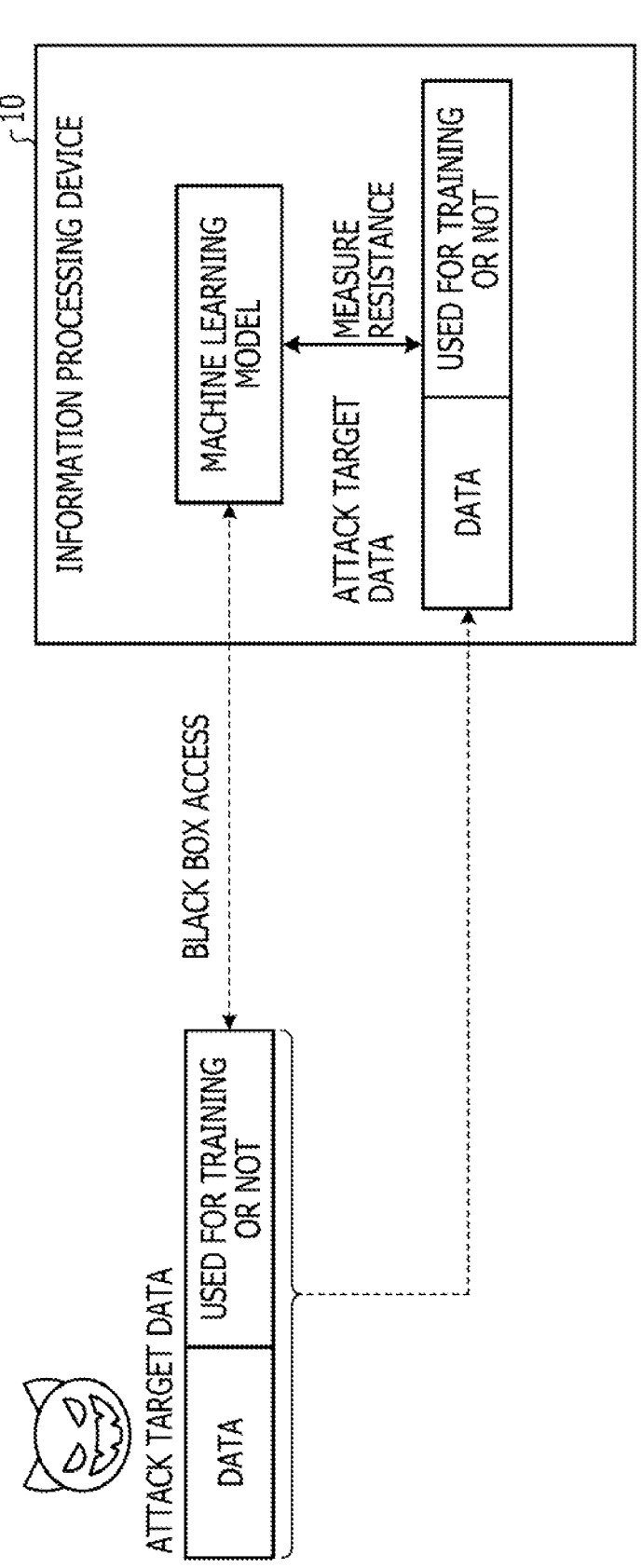
FIG. 1 is a diagram for explaining an information processing device according to a first embodiment.

FIG. 1 is a diagram for explaining an information processing device 10 according to a first embodiment. The information processing device 10 illustrated in FIG. 1 is an example of a computer device that generates a machine learning model using a certain piece of training data and performs prediction and classification using the generated machine learning model.

Typically, a third party who is not a legitimate right holder performs a membership inference attack using a black box access corresponding to the machine learning model so as to estimate whether or not data owned by the third party (attack target data) is used for training of the machine learning model of the information processing device 10. On the other hand, the information processing device 10 measures a resistance to the membership inference attack using the attack target data so as to urge an administrator or the like to take countermeasures against the membership inference attack.

Figures 2A, 2B, 2C:
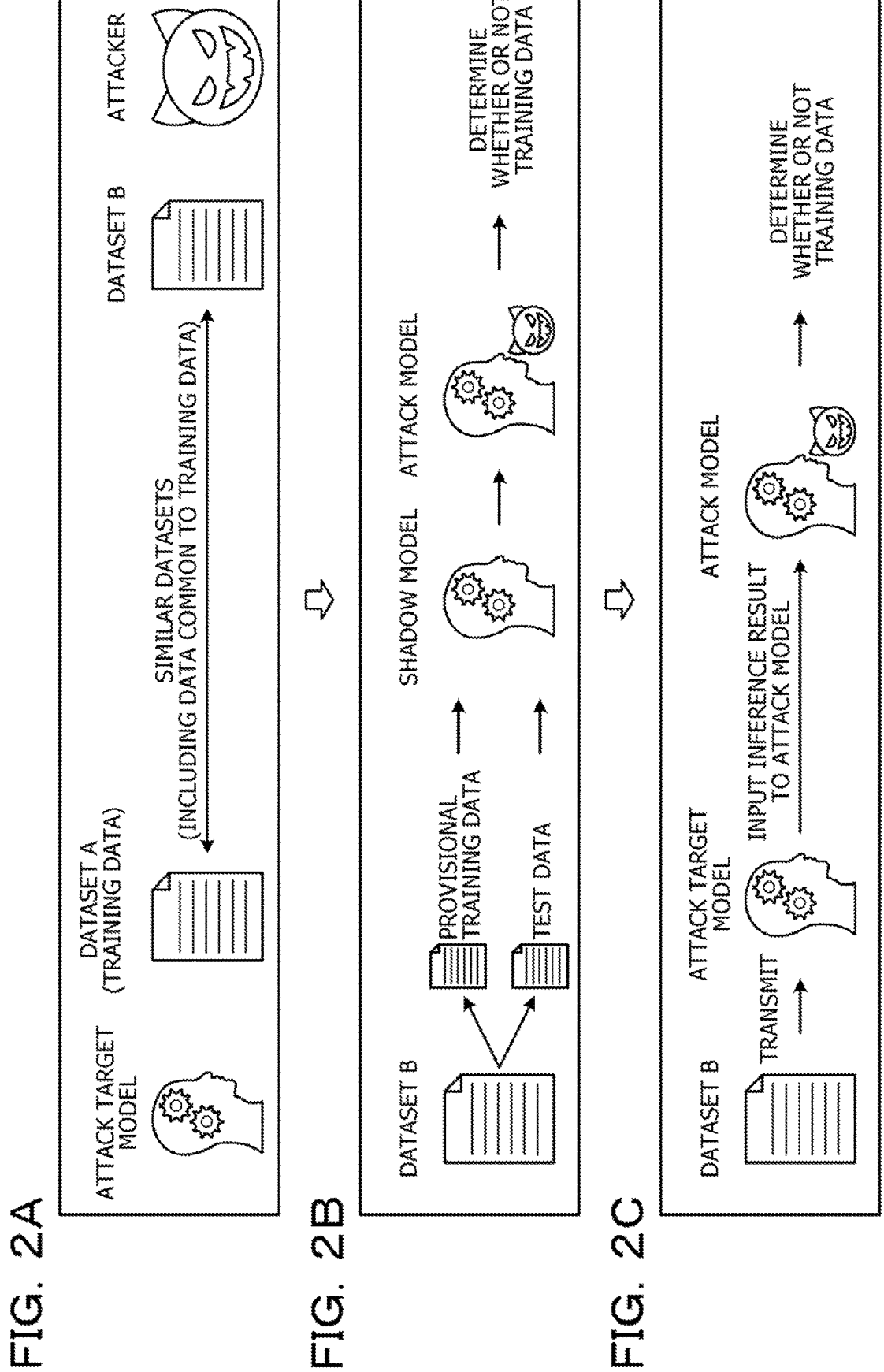
FIGS. 2A to 2C are diagrams for explaining a membership inference attack.

Here, an example of the membership inference attack will be described. FIGS. 2A to 2C are diagrams for explaining the membership inference attack. As illustrated in FIG. 2A, as a premise, an attacker has a dataset B that is similar to a dataset A that is training data of an attack target model to some extent and can perform black box access to a machine learning model to be attacked. Note that the black box access means that, although an output can be obtained by performing input, it is not possible to recognize an internal parameter or the like of the machine learning model.

Under such preconditions, as illustrated in FIG. 2B, the attacker divides the holding dataset B into two pieces including "provisional training data of a shadow model" and "test data of a shadow model". The shadow model is a machine learning model that has a function same as the machine learning model to be attacked and is trained by the attacker. The attacker trains the shadow model using the "provisional training data of the shadow model".

Furthermore, the attacker trains an attack model that outputs whether or not output data of the shadow model is training data using the output of the shadow model as an input, using the shadow model and the two pieces of data described above. Note that the output data corresponds to a certainty factor vector or the like in a case of a classification model.

Thereafter, as illustrated in FIG. 2C, the attacker inputs data to be attacked into the machine learning model to be attacked and inputs its output into the attack model so as to obtain an inference result indicating whether or not the data is the training data.

The attacker specifies data that is likely to be used for the machine learning model included in the information processing device 10 by such a membership inference attack. Therefore, a user of the machine learning model has a possibility that content of undisclosed data is specified by the membership inference attack, and a risk of leakage of personal information increases.

For such a membership inference attack, an attack resistance is evaluated by a technique such as grid search. However, measurement takes long time, and it is difficult to efficiently evaluate a resistance to the membership inference attack.

Therefore, the information processing device 10 according to the first embodiment uses characteristics that the resistance to the membership inference attack increases as an amount of synthetic data increases and efficiently evaluates the resistance to the membership inference attack.

For example, the information processing device 10 acquires each attack result of the membership inference attack for each machine learning model measured using each machine learning model having different synthetic data used for training that is synthetic data simulating the training data and a plurality of pieces of data to be attacked by the membership inference attack. The information processing device 10 specifies specific pieces of data from among the plurality of pieces of data on the basis of each attack result.

The information processing device 10 performs the membership inference attack using the specific piece of data on a specific machine learning model of which the amount of the synthetic data corresponds to an intermediate value of the amounts of the synthetic data used for the respective machine learning models. The information processing device 10 evaluates a resistance (MI resistance) to the membership inference attack to the specific machine learning model on the basis of each attack result and an attack result for the specific piece of data.

Figure 3:
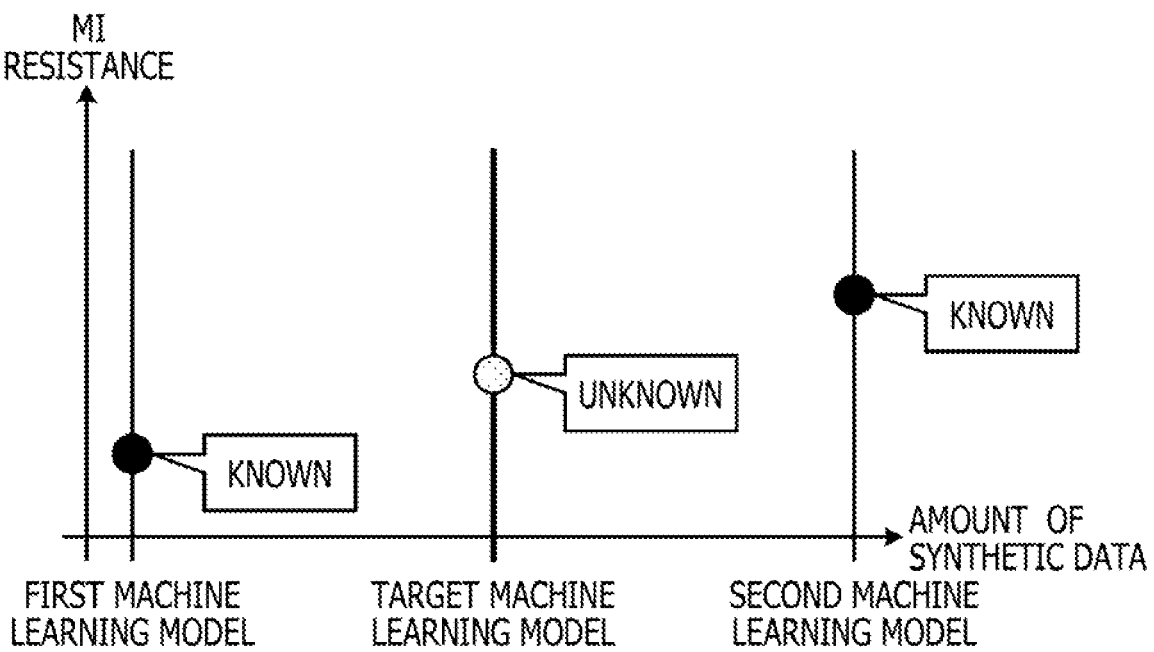
FIG. 3 is a diagram for explaining membership inference attack resistance evaluation by the information processing device according to the first embodiment.

FIG. 3 is a diagram for explaining the membership inference attack resistance evaluation by the information processing device 10 according to the first embodiment. As illustrated in FIG. 3, the information processing device 10 generates a plurality of machine learning models using respective training datasets of which amounts of synthetic data vary.

Then, the information processing device 10 acquires a result of the resistance to the membership inference attack for a first machine learning model generated using training data including synthetic data of which the number of pieces of synthetic data is smaller than synthetic data used for a machine learning model to be evaluated. Furthermore, the information processing device 10 acquires a result of the resistance to the membership inference attack for a second machine learning model generated using training data including synthetic data of which the number of pieces of synthetic data is larger than synthetic data used for a target machine learning model.

Then, the information processing device 10 compares two known attack results, actually attacks only data of which the attack result has been changed, and adopts the known result of data of which the attack result has not been changed.

Therefore, because the information processing device 10 can efficiently evaluate the resistance to the membership inference attack by diverting the known attack results and narrowing data to be attacked using characteristics of the membership inference attack, the information processing device 10 can efficiently evaluate the resistance to the membership inference attack.

Functional Configuration

Figure 4:
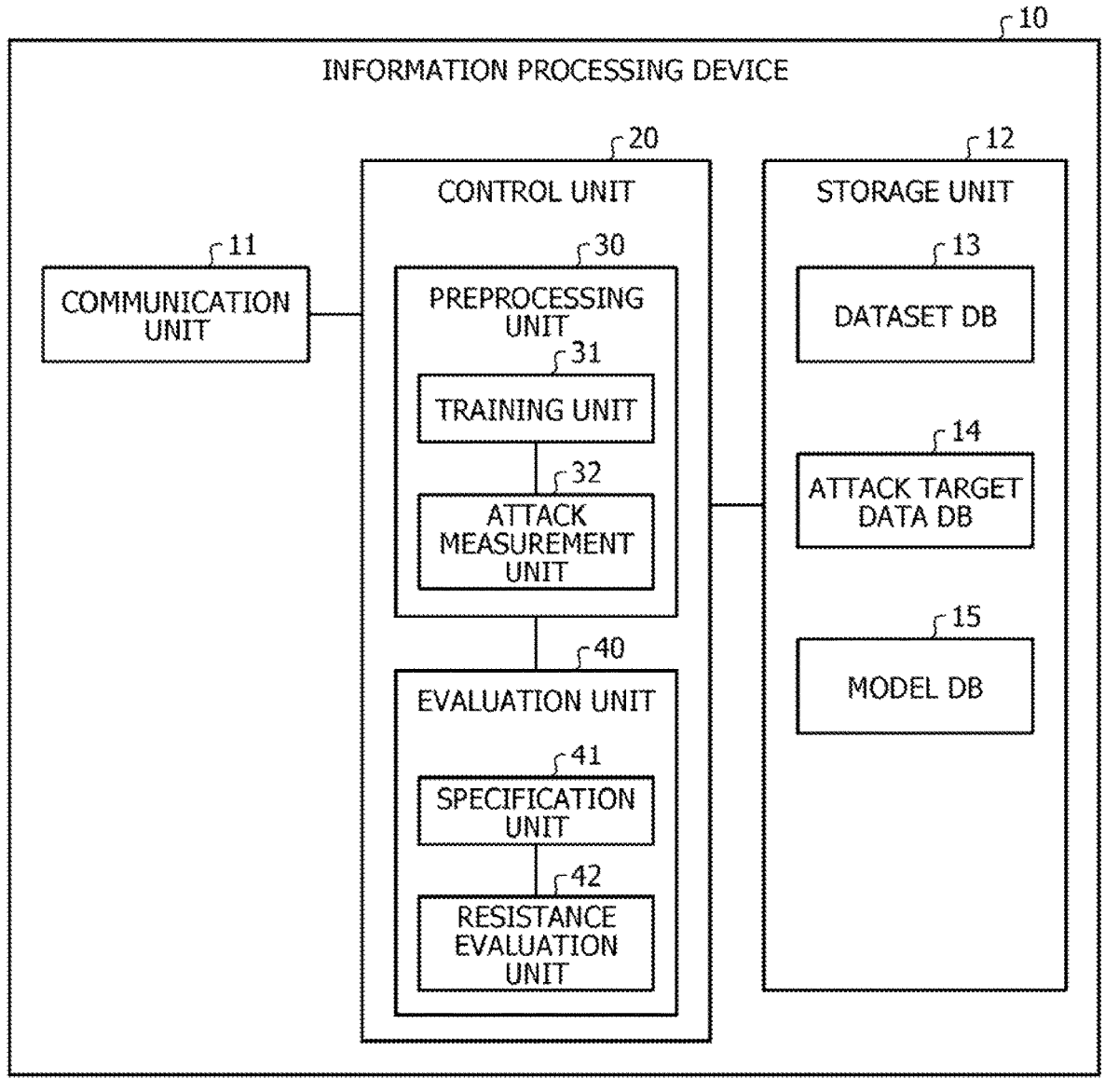
FIG. 4 is a functional block diagram illustrating a functional configuration of the information processing device according to the first embodiment.

FIG. 4 is a functional block diagram illustrating a functional configuration of the information processing device 10 according to the first embodiment. As illustrated in FIG. 4, the information processing device 10 includes a communication unit 11, a storage unit 12, and a control unit 20.

The communication unit 11 is a processing unit that controls communication with another device, and is implemented by, for example, a communication interface or the like. For example, the communication unit 11 transmits and receives various types of data to and from an administrator's terminal and transmits evaluation results or the like.

The storage unit 12 is a processing unit that stores various types of data, programs executed by the control unit 20, and the like, and is achieved by, for example, a memory, a hard disk, or the like. The storage unit 12 stores a dataset DB 13, an attack target data DB 14, and a model DB 15.

The dataset DB 13 is a database that stores data used for training of the machine learning model. FIG. 5 is a diagram illustrating an example of information stored in the dataset DB 13. As illustrated in FIG. 5, the dataset DB 13 stores a training data group and a test data group.

The training data group stores "training data" and a "label" in association with each other. In the "training data" stored here, data used for machine learning is registered, and in the "label", so-called correct answer information (teacher label) is registered. In the example in FIG. 5, it is illustrated that actual training data A to which a label A is set is registered.

The test data group stores "test data" and a "label" in association with each other. In the "test data" stored here, data used for a test at the time of training of machine learning is registered, and in the "label", so-called correct answer information (teacher label) is registered. In the example in FIG. 5, it is illustrated that actual test data A to which a label A is set is registered.

Note that, in a case where a machine learning model for determining whether or not an object is a dog or other than a dog from image data is assumed, image data to which a label "dog" is set, image data to which a label "cat" is set, or the like correspond to the training data and the test data.

Figure 6:
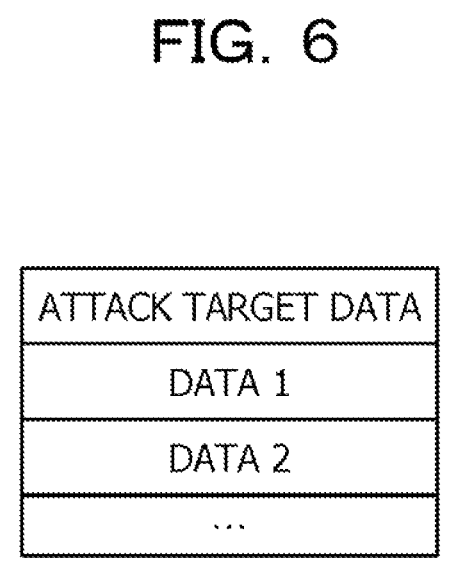

The attack target data DB 14 is a database that stores data to be a target of the membership inference attack. FIG. 6 is a diagram illustrating an example of information stored in the attack target data DB 14. As illustrated in FIG. 6, the attack target data DB 14 stores "attack target data" in which it is assumed that a third party who is not a legitimate right holder estimate whether or not data is used for training data. In the example in FIG. 6, it is illustrated that "data 1" and "data 2" are registered as the "attack target data".

The model DB 15 is a database that stores various machine learning models used by the information processing device 10. Each machine learning model stored here may be also generated by the information processing device 10, or a known machine learning model that is generated by another device, an administrator, or the like may be also registered.

FIG. 7 is a diagram illustrating an example of information stored in the model DB 15. As illustrated in FIG. 7, the model DB 15 stores a "model" and a "type" in association with each other. In the "model" stored here, a machine learning model is registered, and in the "type", information indicating an application, a performance, or the like of the machine learning model is registered.

In the example in FIG. 7, it is illustrated that a machine learning model M1 generated using a training dataset that includes no synthetic data is registered. Furthermore, it is also illustrated that a machine learning model M2 generated using a training dataset of which 10% of the entire training dataset is synthetic data is registered. Furthermore, it is illustrated that an attack model that outputs whether or not the input data is used as the training data according to the input data is registered.

The control unit 20 is a processing unit that is in charge of the entire information processing device 10 and is implemented by, for example, a processor or the like. The control unit 20 includes a preprocessing unit 30 and an evaluation unit 40. Note that the preprocessing unit 30 and the evaluation unit 40 are implemented by an electronic circuit mounted on a processor or the like, a process executed by the processor, or the like.

The preprocessing unit 30 is a processing unit that includes a training unit 31 and an attack measurement unit 32 and executes preprocessing before the resistance to the membership inference attack is evaluated.

The training unit 31 is a processing unit that performs training of each machine learning model and generates each machine learning model. For example, the training unit 31 generates a plurality of training datasets of which the number of pieces of synthetic data varies for the training dataset including the training data group and the synthetic data, generates a plurality of machine learning models respectively using the plurality of training datasets, and stores the generated machine learning models in the storage unit 12. For example, the training unit 31 generates 10 machine learning models of which the numbers of pieces of synthetic data are different from each other by 10%. Note that the training unit 31 generates the synthetic data by adding a label to data in which an image in the training data is rotated, data in which a scale and colors in the training data are changed, data that is acquired from the Internet and is similar to the image in the training data, or the like. Note that the synthetic data may be also registered by an administrator or the like.

Figures 8A, 8B, 8C:
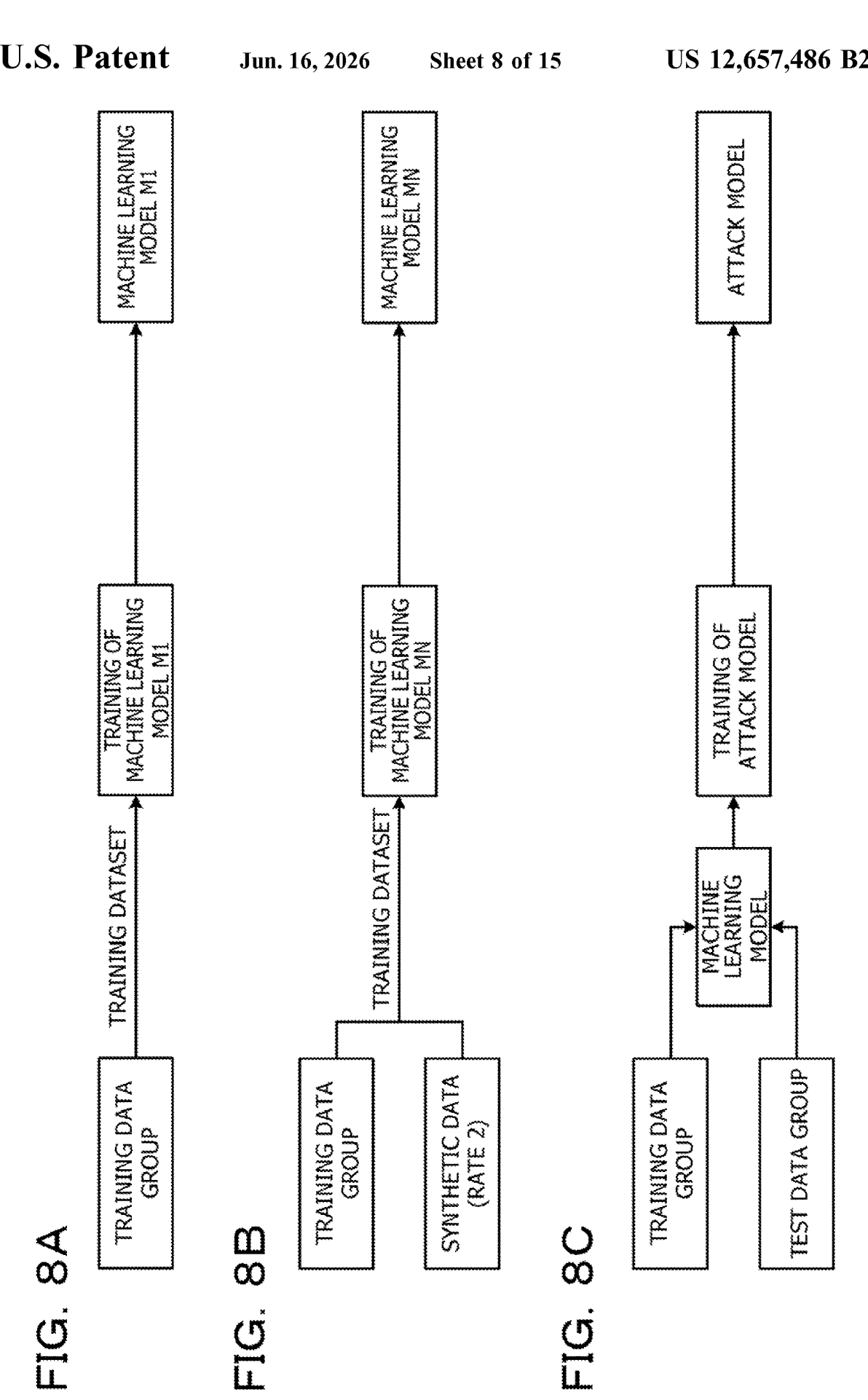
FIGS. 8A to 8C are diagrams for explaining generation of each machine learning model in preprocessing.

FIGS. 8A to 8C are diagrams for explaining generation of each machine learning model in preprocessing. As illustrated in FIG. 8A, the training unit 31 trains the machine learning model M1 using only the training data group that does not include the synthetic data as the training dataset and generates the machine learning model M1. For example, the training unit 31 trains the machine learning model M1 so as to reduce an error between an output of the machine learning model M1 according to an input of actual training data included in the training data group and a label of the actual training data.

Furthermore, as illustrated in FIG. 8B, the training unit 31 trains a machine learning model MN using a training dataset including a training data group and synthetic data twice of the training data group and generates the machine learning model MN. For example, the training unit 31 trains the machine learning model MN so as to reduce an error between the output of the machine learning model M1 according to the input of the actual training data or the synthetic data and a label of the actual training data or the synthetic data.

Furthermore, as illustrated in FIG. 8C, the training unit 31 trains the attack model using the training data group and the test data group and generates the attack model. For example, the training unit 31 inputs each piece of the actual training data in the training data group into the machine learning model M1 and inputs an output result (certainty factor) of the machine learning model M1 into the attack model. Then, the training unit 31 trains the attack model so that an output value of the attack model is a "value indicating that the input data is used for training". On the other hand, the training unit 31 inputs each piece of the actual test data in the test data group into the machine learning model M1 and inputs an output result (certainty factor) of the machine learning model M1 into the attack model. Then, the training unit 31 trains the attack model so that an output value of the attack model is a "value indicating that the input data is not used for training". Note that the training unit 31 can train the attack model using each trained machine learning model.

The attack measurement unit 32 is a processing unit that generates a resistance to the membership inference attack using the trained machine learning model. For example, the attack measurement unit 32 actually performs the membership inference attack on the trained machine learning model, collects the attack results, and stores the attack results in the storage unit 12 or the like.

Figures 9A, 9B:
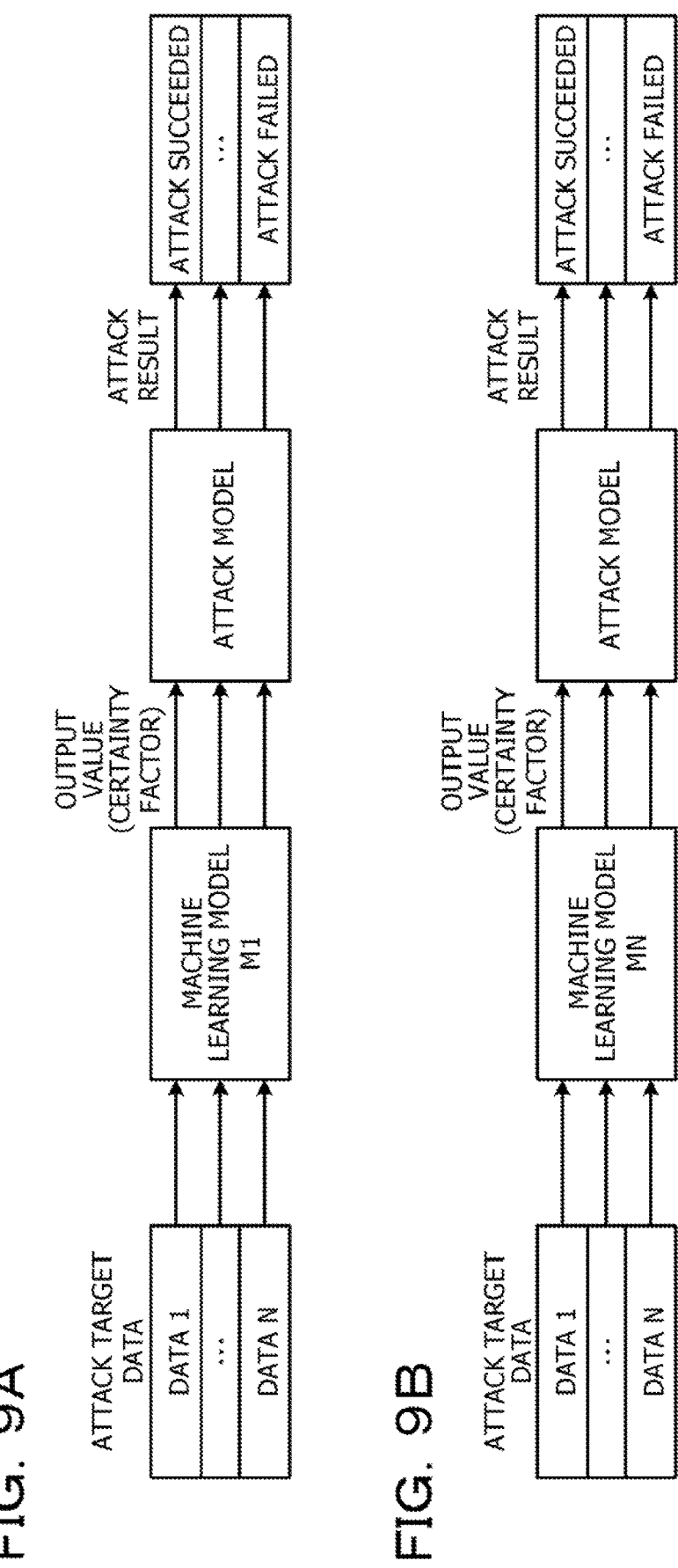
FIGS. 9A and 9B are diagrams for explaining generation of an attack result in the preprocessing.

FIGS. 9A and 9B are diagrams for explaining generation of an attack result in preprocessing. FIGS. 9A and 9B illustrate examples in which the membership inference attack is actually performed on the machine learning models M1 and MN that are the examples described above.

As illustrated in FIG. 9A, the attack measurement unit 32 inputs each of data 1 to data N stored in the attack target data DB 14 into the machine learning model M1 and acquires each output value of the machine learning model M1. Then, the attack measurement unit 32 inputs each output value corresponding to each of the data 1 to the data N into the attack model, acquires each output value of the attack model, and determines the attack result on the basis of each output value. For example, the attack measurement unit 32 determines that attack on data of which the output value of the attack model is equal to or more than a threshold is succeeded and attack on data of which the output value of the attack model is less than the threshold fails. Furthermore, the attack measurement unit 32 calculates a rate of the attack failures in each data stored in the attack target data DB 14 as an index representing an attack resistance.

Similarly, as illustrated in FIG. 9B, each of the data 1 to the data N stored in the attack target data DB 14 is input into the machine learning model MN, and each output value of the machine learning model MN is acquired. Then, the attack measurement unit 32 inputs each output value corresponding to each of the data 1 to the data N into the attack model, acquires each output value of the attack model, and determines the attack result on the basis of each output value. The attack measurement unit 32 calculates a rate of the attack failures in each piece of data stored in the attack target data DB 14 as an index representing an attack resistance.

Returning to FIG. 4, the evaluation unit 40 is a processing unit that includes a specification unit 41 and a resistance evaluation unit 42 and evaluates a resistance to the membership inference attack for the machine learning model The specification unit 41 is a processing unit that compares known attack results for a plurality of machine learning models trained using training datasets of which amounts of synthetic data are different from each other when a resistance to the membership inference attack for one machine learning model is measured and specifies data to be actually attacked.

For example, the specification unit 41 specifies a first machine learning model trained using synthetic data of which the number of pieces is less than synthetic data used to train the machine learning model and acquires a first attack result of the first machine learning model. Furthermore, the specification unit 41 specifies a second machine learning model trained using synthetic data of which the number of pieces is more than the synthetic data used to train the machine learning model and acquires a second attack result of the second machine learning model. Then, the specification unit 41 compares the first attack result with the second attack result and specifies data of which the attack results are different as the attack target data that is an actual attack target. Thereafter, the specification unit 41 outputs the specified attack target data to the resistance evaluation unit 42.

Figure 10:
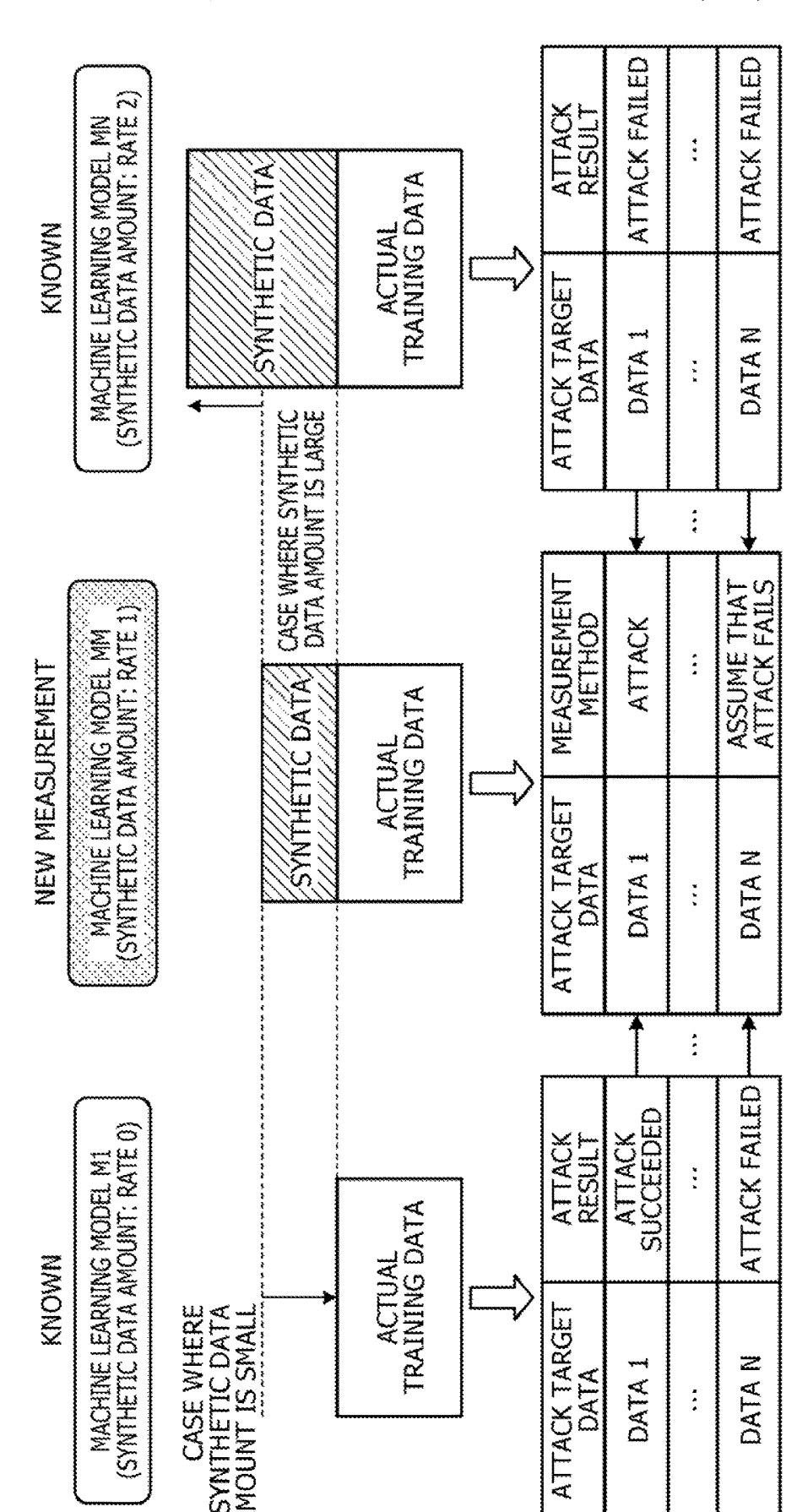
FIG. 10 is a diagram for explaining specification of attack target data.

FIG. 10 is a diagram for explaining specification of the attack target data. As illustrated in FIG. 10, in a case where the resistance of the machine learning model MM generated using the training dataset of which the number of pieces of synthetic data (rate 1) is the same amount as the training data group is evaluated, the specification unit 41 acquires an attack result of the machine learning model M1 generated using the training dataset of which the number of pieces of synthetic data is zero and the amount of the synthetic data is less than the machine learning model MM. Furthermore, the specification unit 41 acquires an attack result of the machine learning model MM generated using the training dataset of which the number of pieces of synthetic data is twice (rate 2) of the training data and the amount of the synthetic data is larger than the machine learning model MN.

Then, the specification unit 41 compares the attack results of the respective "data 1 to data N" included in each attack result and specifies "data 1" having a different attack result. As a result, the specification unit 41 specifies the "data 1" of the attack target data "from the data 1 to the data N" as an attack target for the machine learning model MM to be evaluated.

The resistance evaluation unit 42 is a processing unit that actually performs the membership inference attack on the data specified by the specification unit 41 and evaluates a resistance of the machine learning model. Explaining the example described above, in a case of evaluating the resistance of the machine learning model MM, the specification unit 41 actually attacks the "data 1".

Figure 11:
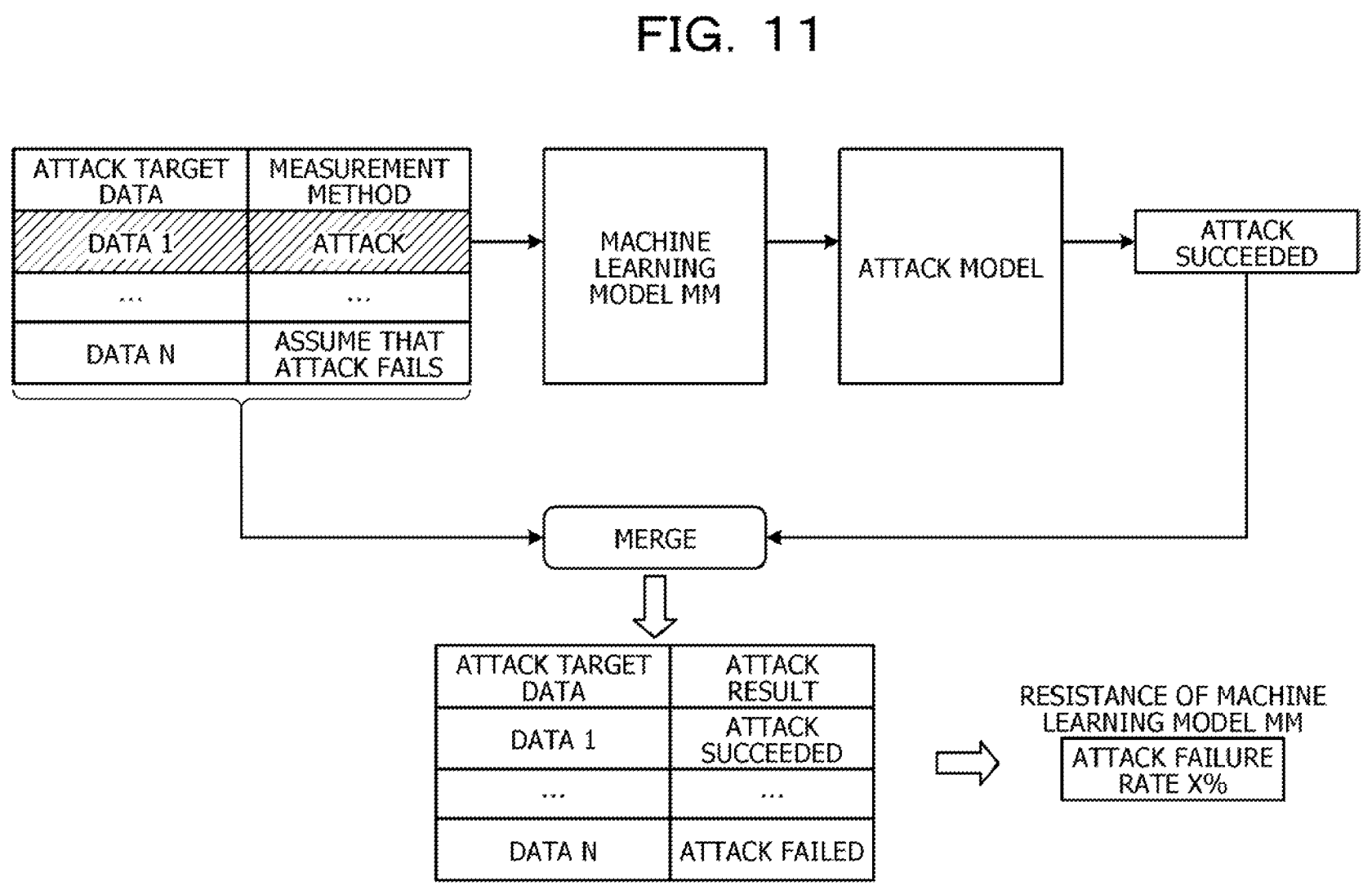

FIG. 11 is a diagram for explaining the membership inference attack resistance evaluation. As illustrated in FIG. 11, the resistance evaluation unit 42 inputs the "data 1" of the attack target data "from the data 1 to the data N" into the machine learning model MM and acquires an output result. Subsequently, the resistance evaluation unit 42 inputs the output result of the machine learning model MM into the attack model and determines that the attack is successful on the basis of the output result of the attack model. Then, the resistance evaluation unit 42 adopts the "attack success" specified in the above for the data 1 to be attacked and the attack result of the machine learning model M1 for other data to be attacked and generates an attack result of the machine learning model MM. Thereafter, the resistance evaluation unit 42 calculates a rate (ratio) of attack failures among the attack results as the resistance of the machine learning model MM.

As described above, the evaluation unit 40 can efficiently perform resistance evaluation by narrowing the attack target using the known attack results. Furthermore, by recursively repeating the processing described above, the evaluation unit 40 can efficiently evaluate the resistance to the membership inference attack for all the machine learning models of which the amounts of the synthetic data vary.

Figure 12:
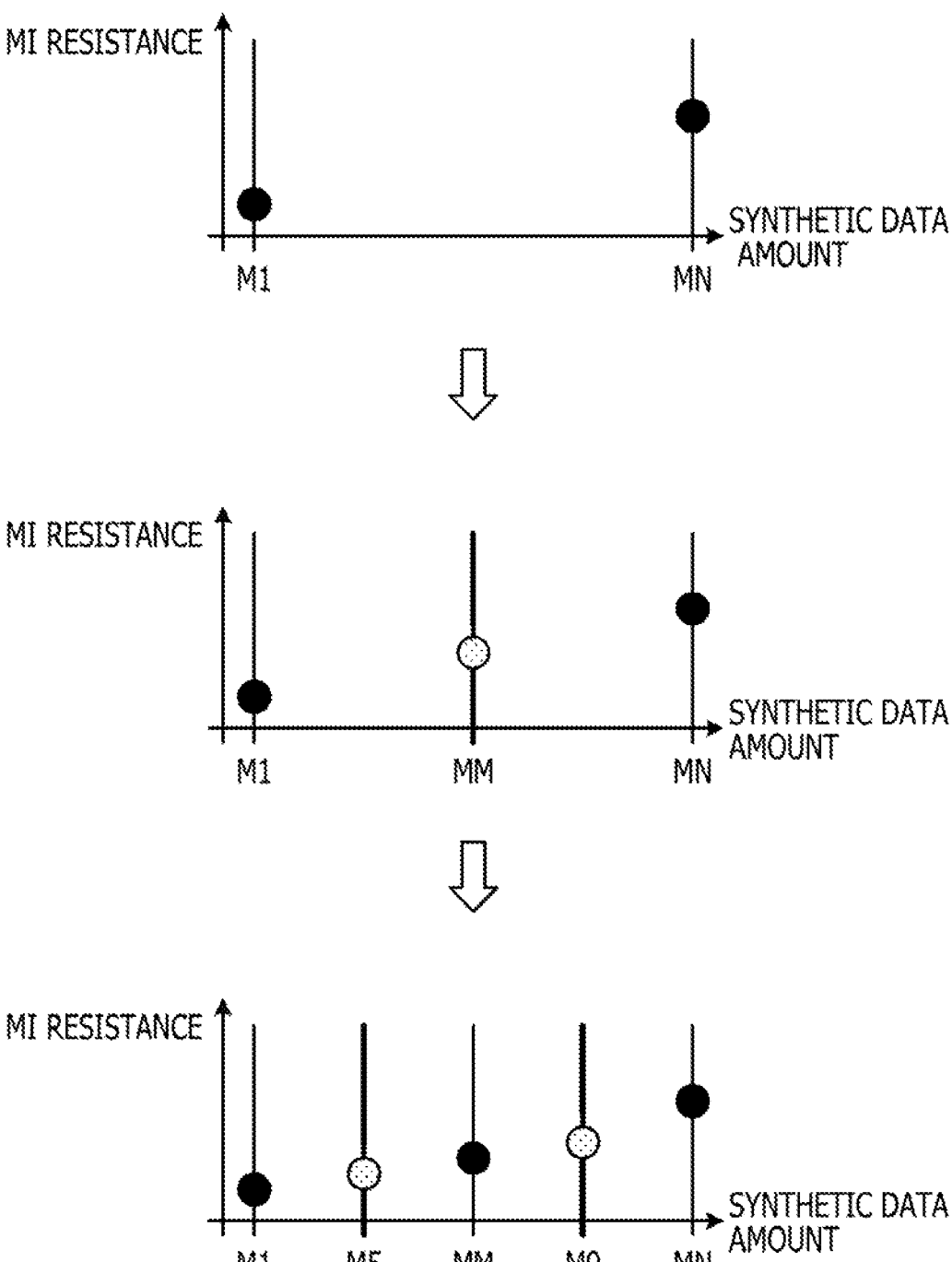
FIG. 12 is a diagram for explaining an example in which the membership inference attack resistance evaluation is recursively repeated.

FIG. 12 is a diagram for explaining an example in which the membership inference attack resistance evaluation is recursively repeated. As illustrated in FIG. 12, the evaluation unit 40 actually attacks all the pieces of attack target data for each of the machine learning model M1 having the smallest amount of the synthetic data and the machine learning model MN having the largest amount of the synthetic data and generates attack results.

Next, the evaluation unit 40 specifies an unevaluated machine learning model MM that is a machine learning model using a synthetic data amount that is positioned in the middle of the two machine learning models of which the attack results are known. Then, the evaluation unit 40 attacks only the data of which the attack result has been changed of the attack result of the machine learning model M1 and the attack result of the machine learning model MN and sets the result of the data of which the attack result has not been changed as the attack result.

Next, the evaluation unit 40 specifies an unevaluated machine learning model M5 that is a machine learning model using a synthetic data amount positioned in the middle of the machine learning model M1 and the machine learning model MM. Then, the evaluation unit 40 attacks only the data of which the attack result has been changed of the attack result of the machine learning model M1 and the attack result of the machine learning model MM and sets the result of the data of which the attack result has not been changed as the attack result.

Similarly, the evaluation unit 40 attacks only data of which the attack result has been changed of the attack result of the machine learning model MN and the attack result of the machine learning model MM for an unevaluated machine learning model M9 that uses a synthetic data amount positioned in the middle of the machine learning model MN and the machine learning model MM and sets the result of the data of which the attack result has not been changed as the attack result.

In this way, the evaluation unit 40 recursively repeats to attack only the data of which the attack result has been changed of the previous and subsequent models for the machine learning model of which the number of pieces (amount) of synthetic data is middle of the two machine learning models of which the resistance has been estimated. As a result, the evaluation unit 40 can efficiently evaluate the resistance to the membership inference attack.

Figures 13A, 13B, 13C:
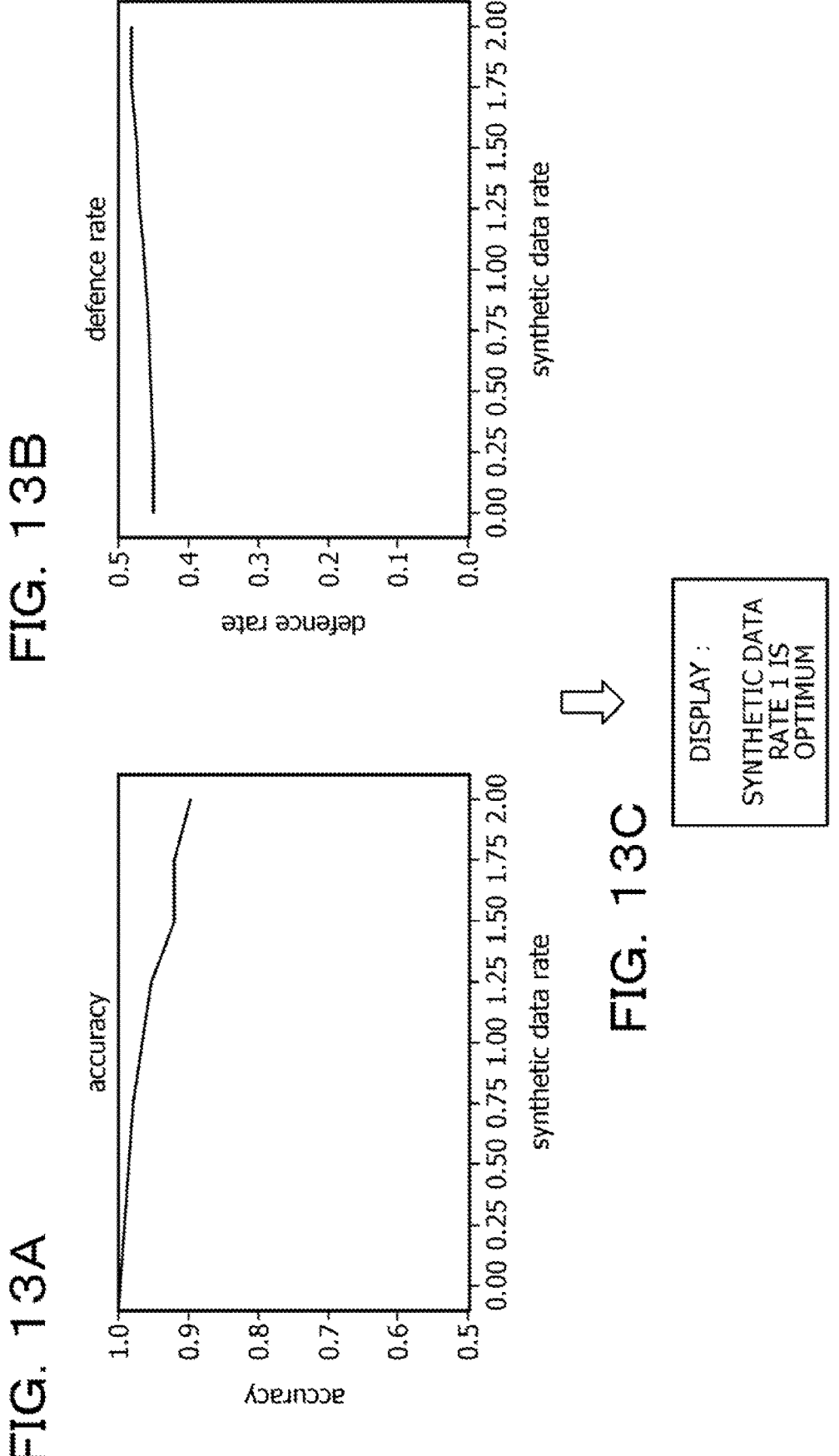
FIGS. 13A to 13C are diagrams for explaining an output example of the membership inference attack resistance evaluation.

Furthermore, the evaluation unit 40 can realize visualization of the index by outputting and displaying the estimation result. FIGS. 13A to 13C are diagrams for explaining an output example of the membership inference attack resistance evaluation. In FIG. 13A, a chart is illustrated in which the horizontal axis indicates "a rate of synthetic data", and the vertical axis indicates "accuracy of a machine learning model". In FIG. 13B, a chart is illustrated in which the horizontal axis indicates "a rate of synthetic data", and the vertical axis indicates "a resistance".

As illustrated in FIG. 13A, as the amount of the synthetic data included in the training data is larger, accuracy of the machine learning model deteriorates. On the other hand, as illustrated in FIG. 13B, as the amount of the synthetic data included in the training data is larger, the resistance to the membership inference attack is higher.

As a result, as illustrated in FIG. 13C, the evaluation unit 40 generates a screen indicating that a machine learning model of which a rate of synthetic data, of which accuracy is equal to or higher than a threshold (for example, 0.92) and a resistance is equal to or higher than a threshold (for example, 0.45), is "1" is the optimal and outputs the screen to a display unit or the like.

Flow of Processing

Figure 14:
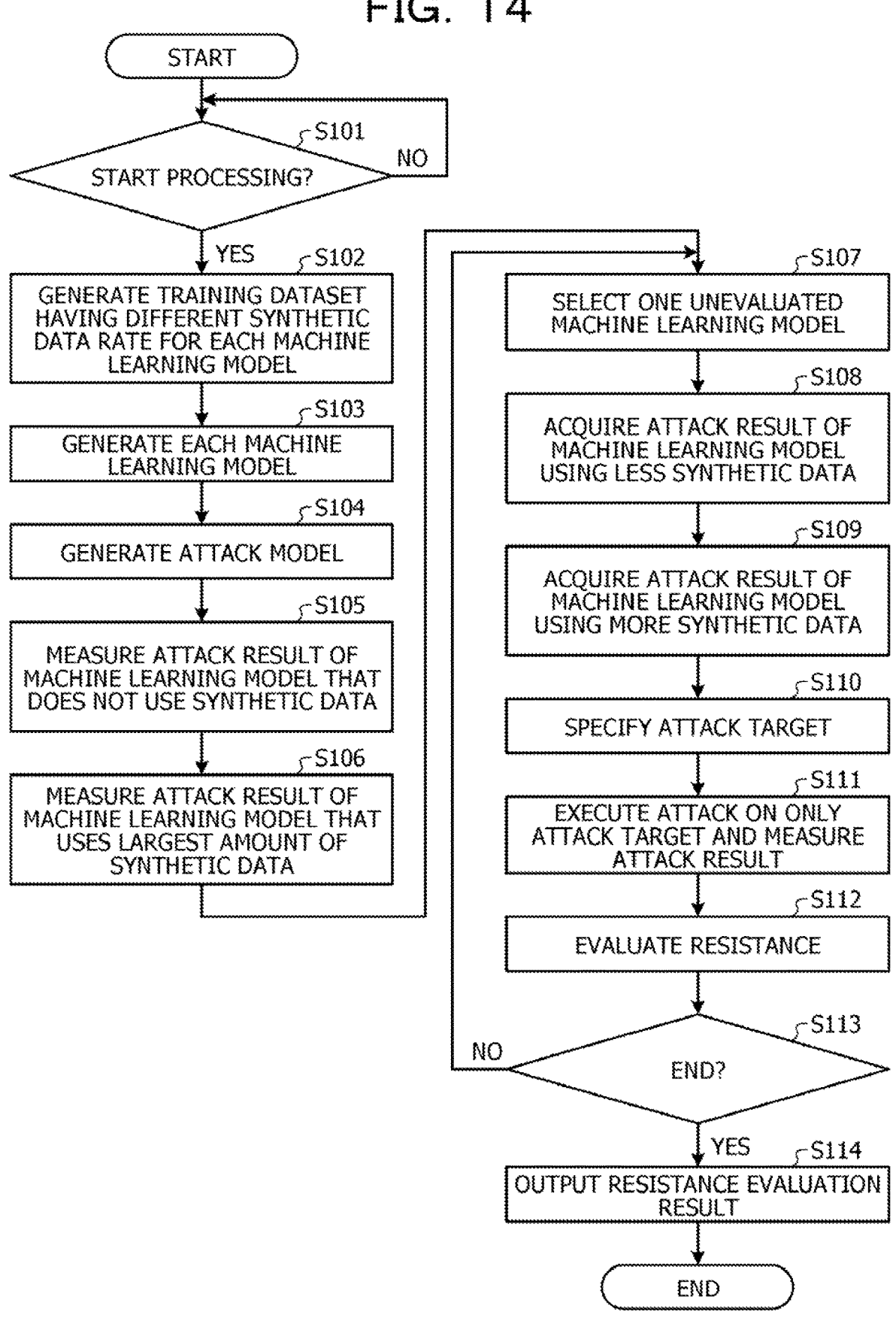
FIG. 14 is a flowchart illustrating a flow of processing according to the first embodiment.

FIG. 14 is a flowchart illustrating a flow of processing according to the first embodiment. As illustrated in FIG. 14, when being instructed to start processing (S101: Yes), the control unit 20 of the information processing device 10 generates a training dataset having a different rate of synthetic data for each machine learning model (S102).

Subsequently, the control unit 20 generates respective machine learning models having different synthetic data amounts using the respective training datasets (S103). Furthermore, the control unit 20 generates an attack model using training data, test data, and each machine learning model (S104).

Then, the control unit 20 measures an attack result of the machine learning model that does not use the synthetic data, using the attack target data DB 14 (S105). Similarly, the control unit 20 measures an attack result of the machine learning model using the largest amount of synthetic data, using the attack target data DB 14 (S106).

Thereafter, the control unit 20 selects one unevaluated machine learning model (S107) and acquires an attack result of a machine learning model using synthetic data with an amount less than a synthetic data amount used for the selected machine learning model (S108). Similarly, the control unit 20 acquires an attack result of a machine learning model using synthetic data with an amount more than the synthetic data amount used for the selected machine learning model (S109).

Then, the control unit 20 compares the attack results and specifies data having a different attack result as an attack target (S110). Thereafter, the control unit 20 attacks only the attack target and measures an attack result (S111) and evaluates a resistance to the membership inference attack (S112).

Here, in a case where processing continues such as a case where an unevaluated machine learning model remains (S113: No), the control unit 20 returns to S107 and executes the subsequent processing on the unevaluated machine learning model. On the other hand, in a case where the processing ends such as a case there is no unevaluated machine learning model (S113: Yes), the control unit 20 outputs an evaluation result of the resistance to the membership inference attack (S114).

Effects

As described above, the information processing device 10 can predict a measurement result under a new condition from the measured results on the basis of an empirically known relationship between the synthetic data and the resistance to the membership inference attack that is a relationship in which the resistance to the membership inference attack increases as the number of pieces of synthetic data increases. Therefore, the information processing device 10 can significantly reduce the number of times of actual attacks, reduce a calculation amount, and efficiently evaluate the resistance to the membership inference attack.

Furthermore, while the information processing device 10 repeatedly performs attacks, the information processing device 10 can overwhelmingly reduce the number of times of attacks as compared with the grid search, and accordingly, a time required for evaluation can be shortened.

Second Embodiment

While the embodiments have been described above, the embodiment may be implemented in various different modes in addition to the embodiments described above.

Numerical Values, Etc

Numerical value examples, training data examples, the number of pieces of training data, the number of machine learning models, the rate of the synthetic data, or the like used in the embodiments described above are merely examples and can be arbitrarily changed. Furthermore, the flow of the processing described in each flowchart can be appropriately changed within a consistent range. Furthermore, for each model, a model generated by various algorithms including a neural network or the like can be adopted.

Furthermore, each machine learning model, the attack model, the attack result of the machine learning model with the minimum synthetic data amount, the attack result of the machine learning model with the largest synthetic data amount may be also generated in advance. Furthermore, the training data or the like is not limited to image data, and various data formats such as sound data, moving image data, time-series data, or waveform data can be adopted.

Furthermore, in the embodiments described above, an example has been described in which the information processing device 10 compares the two known attack results. However, the embodiment is not limited to this. For example, the information processing device 10 can compare three or more known attack results with each other and perform the evaluation described above on the middle of combinations having different attack results.

System

Pieces of information including a processing procedure, a control procedure, a specific name, various types of data, and parameters described above or illustrated in the drawings may be also changed in any ways unless otherwise specified.

Furthermore, specific forms of distribution and integration of components of individual devices are not limited to those illustrated in the drawings. For example, the preprocessing unit 30 and the evaluation unit 40 may be also integrated. For example, all or some of the components may be also configured by being functionally or physically distributed or integrated in optional units according to various types of loads, usage situations, or the like. Moreover, all or some of individual processing functions of each device may be implemented by a central processing unit (CPU) and a program analyzed and executed by the CPU, or may be implemented as hardware by wired logic.

Hardware

Figure 15:
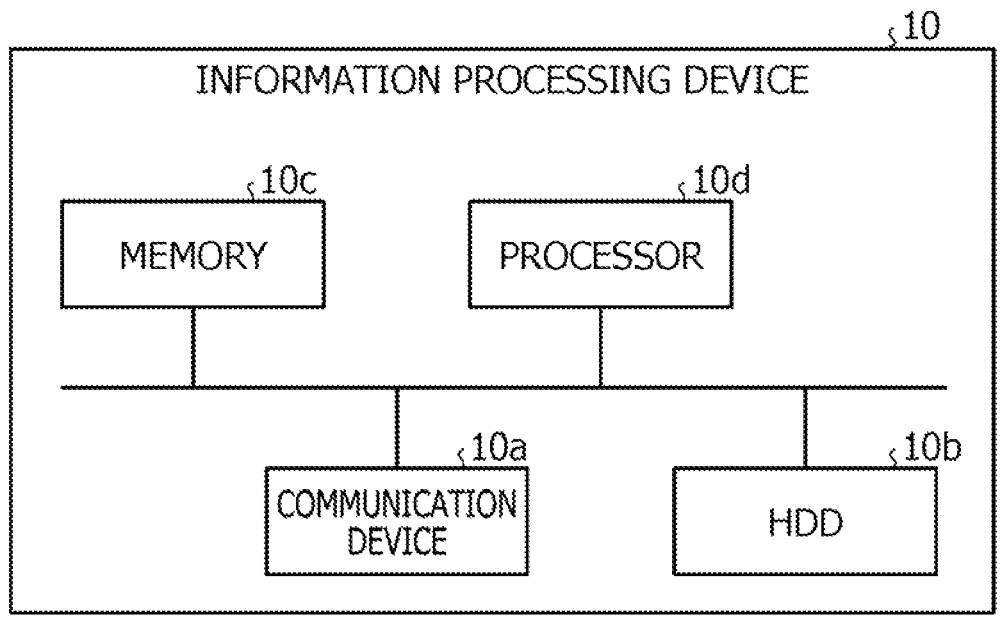
FIG. 15 is a diagram for explaining an exemplary hardware configuration.

FIG. 15 is a diagram for explaining an exemplary hardware configuration. As illustrated in FIG. 15, the information processing device 10 includes a communication device 10a, a hard disk drive (HDD) 10b, a memory 10c, and a processor 10d. Furthermore, the units illustrated in FIG. 15 are mutually connected by a bus or the like.

The communication device 10a is a network interface card or the like, which communicates with another device. The HDD 10b stores a program that operates the functions illustrated in FIG. 4, and a DB.

The processor 10d reads a program that executes processing similar to the processing of each processing unit illustrated in FIG. 4 from the HDD 10b or the like, and develops the read program in the memory 10c, thereby operating a process that executes each function described with reference to FIG. 4 or the like. For example, this process executes a function similar to the function of each processing unit included in the information processing device 10. For example, the processor 10d reads a program having a function similar to the preprocessing unit 30, the evaluation unit 40, or the like from the HDD 10b or the like. Then, the processor 10d executes a process for executing processing similar to the preprocessing unit 30, the evaluation unit 40, or the like.

As described above, the information processing device 10 operates as an information processing device that executes an evaluation method by reading and executing a program. Furthermore, the information processing device 10 may also implement functions similar to the functions of the above-described embodiments by reading the program described above from a recording medium by a medium reading device and executing the read program described above. Note that the program referred to in other embodiments is not limited to being executed by the information processing device 10. For example, the embodiments described above may be also similarly applied to a case where another computer or server executes the program or a case where these cooperatively execute the program.

This program may be also distributed via a network such as the Internet. Furthermore, this program may be recorded in a computer-readable recording medium such as a hard disk, flexible disk (FD), compact disc read only memory (CD-ROM), magneto-optical disk (MO), or digital versatile disc (DVD), and can be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an evaluation program for causing a computer to execute processing comprising:

acquiring, for each of a plurality of machine learning models, an attack result of a membership inference attack performed on the each of plurality of machine learning models, the acquiring of the attack result for a respective machine learning model being performed by using the respective machine learning model and a plurality of pieces of data to be attacked by the membership inference attack, each of the plurality of machine learning models being a machine learning model trained by using synthetic data that simulates training data, an amount of the synthetic data used for each of the plurality of machine learning models being different from each other;

specifying, based on the acquired attack result for each of the plurality of machine learning models, specific data from among the plurality of pieces of data;

performing the membership inference attack by using the specific data for a specific machine learning model, the specific machine learning model being a machine learning model for which an amount of the synthetic data is between amounts of the synthetic data used for training of any two machine learning models of the plurality of learning models; and evaluating, based on an attack result for the specific data and the attack result acquired for each of the plurality of machine learning models, a resistance to the membership inference attack for the specific machine learning model.

2. The non-transitory computer-readable recording medium according to claim 1, wherein the specifying specifies data with a different attack result of the attack results from among the plurality of pieces of data as the specific data.

3. The non-transitory computer-readable recording medium according to claim 2, wherein the evaluating selects each attack result regarding data other than the specific data, generates an attack result for the specific machine learning model by using each selected attack result and the attack result for the specific data, and calculates a rate of attack failures in the attack result for the specific machine learning model as the resistance to the membership inference attack for the specific machine learning model.

4. The non-transitory computer-readable recording medium according to claim 1, for causing the computer to execute processing further comprising:

generating a plurality of machine learning models by using a plurality of training datasets of which the synthetic data amounts are different from each other;

performing the membership inference attack on a first machine learning model generated by using a training dataset that does not include the synthetic data and generating a first attack result that indicates whether or not it is possible to estimate each of the plurality of pieces of data; and performing the membership inference attack on a second machine learning model generated by using a training dataset that includes the most pieces of synthetic data and generating a second attack result that indicates whether or not it is possible to estimate each of the plurality of pieces of data.

5. The non-transitory computer-readable recording medium according to claim 4, wherein the acquiring acquires the first attack result and the second attack result, the specifying compares the first attack result and the second attack result and specifies the specific data with a different attack result from among the plurality of pieces of data, the performing performs the membership inference attack by using the specific data on a third machine learning model of which an amount of the synthetic data is an intermediate amount between the first machine learning model and the second machine learning model, and the evaluating evaluates a resistance to the membership inference attack for the third machine learning model on the basis of the first attack result or the second attack result and the attack result for the specific data.

6. The non-transitory computer-readable recording medium according to claim 5, wherein the acquiring sequentially specifies an unevaluated machine learning model until evaluation of the resistance to the membership inference attack for each of the plurality of machine learning models is completed, specifies a machine learning model of which an amount of the synthetic data is less than the unevaluated machine learning model and a machine learning model of which an amount of the synthetic data is more than the unevaluated machine learning model from among the plurality of machine learning models, and acquires the attack results of the two specified machine learning models, the specifying compares the attack results of the two machine learning models and specifies the specific data, the performing performs the membership inference attack by using the specific data on the unevaluated machine learning model, and the evaluating evaluates a resistance to the membership inference attack for the unevaluated machine learning model on the basis of the attack results of the two machine learning models and the attack result for the specific data.

7. The non-transitory computer-readable recording medium according to claim 6, wherein the acquiring, the specifying, the performing, and the evaluating recursively repeat processing until evaluation of a resistance to the membership inference attack for each of the plurality of machine learning models is completed.

8. A computer-implemented evaluation method comprising:

acquiring, for each of a plurality of machine learning models, an attack result of a membership inference attack performed on the each of plurality of machine learning models, the acquiring of the attack result for a respective machine learning model being performed by using the respective machine learning model and a plurality of pieces of data to be attacked by the membership inference attack, each of the plurality of machine learning models being a machine learning model trained by using synthetic data that simulates training data, an amount of the synthetic data used for each of the plurality of machine learning models being different from each other;

specifying, based on the acquired attack result for each of the plurality of machine learning models, specific data from among the plurality of pieces of data;

performing the membership inference attack by using the specific data for a specific machine learning model, the specific machine learning model being a machine learning model for which an amount of the synthetic data is between amounts of the synthetic data used for training of any two machine learning models of the plurality of learning models; and evaluating, based on an attack result for the specific data and the attack result acquired for each of the plurality of machine learning models, a resistance to the membership inference attack for the specific machine learning model.

9. An information processing apparatus comprising:

a memory; and a processor coupled to the memory, the processor being configured to perform processing, the processing including:

acquiring, for each of a plurality of machine learning models, an attack result of a membership inference attack performed on the each of plurality of machine learning models, the acquiring of the attack result for a respective machine learning model being performed by using the respective machine learning model and a plurality of pieces of data to be attacked by the membership inference attack, each of the plurality of machine learning models being a machine learning model trained by using synthetic data that simulates training data, an amount of the synthetic data used for each of the plurality of machine learning models being different from each other;

specifying, based on the acquired attack result for each of the plurality of machine learning models, specific data from among the plurality of pieces of data;

performing the membership inference attack by using the specific data for a specific machine learning model, the specific machine learning model being a machine learning model for which an amount of the synthetic data is between amounts of the synthetic data used for training of any two machine learning models of the plurality of learning models; and evaluating, based on an attack result for the specific data and the attack result acquired for each of the plurality of machine learning models, a resistance to the membership inference attack for the specific machine learning model.

* * * * *